United States Patent Office 3,469,181
Patented Sept. 23, 1969

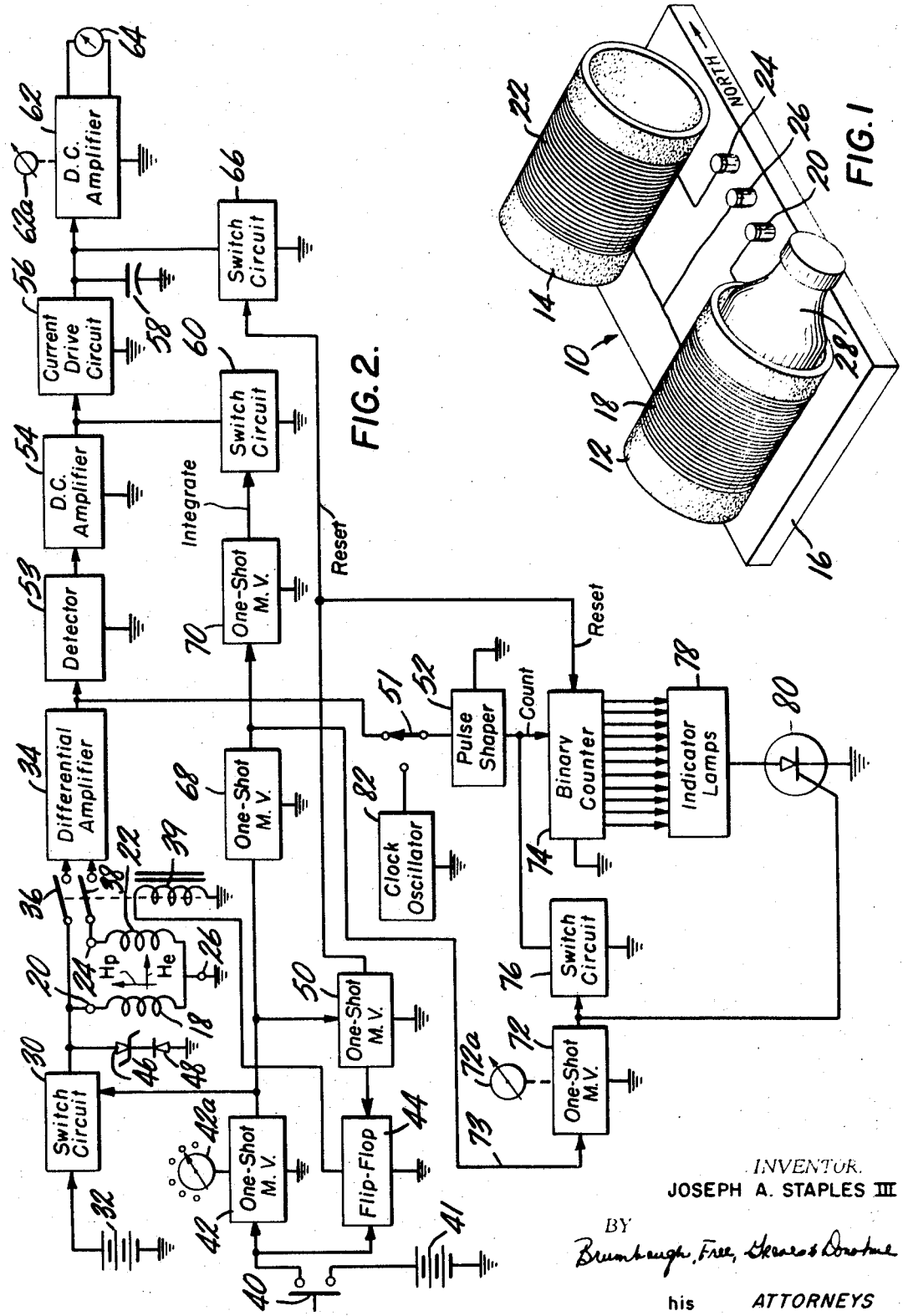

3,469,181
NUCLEAR MAGNETOMETER WITH MEASURE-
MENT SEQUENCING SYSTEM
Joseph A. Staples III, Houston, Tex., assignor to Schlumberger Technology Corporation, Houston, Tex., a corporation of Texas
Filed July 22, 1966, Ser. No. 567,274
Int. Cl. G01n 27/72; G01r 33/08
U.S. Cl. 324—.5
7 Claims

ABSTRACT OF THE DISCLOSURE

In the particular embodiment of the invention described herein, nuclear magnetism testing apparatus polarizes the magnetic moments of the atomic nuclei of a chemical element by supplying a locally generated unidirectional field thereto for a selected period of time. Following removal of the unidirectional field, the frequency of the atomic nuclei undergoing phase-coherent free precession under the influence of the earth's magnetic field is counted directly and a visual reproduction of the accumulated count is provided. Also provided is a visual indication of the initial magnitude of the voltage induced in a detecting coil by the alternating magnetic field produced by the precessing atomic nuclei.

---

This invention relates to nuclear magnetism testing apparatus, and, more particularly, to a new and improved portable-type nuclear magnetism testing apparatus having considerable versatility and utility for purposes of making various nuclear magnetism measurements.

Nuclear magnetism relates to the fact that the atomic nuclei of some chemical elements have magnetic moments. These magnetic moments can be polarized in a common direction by a locally generated unidirectional magnetic field. This field can then be terminated and the polarized magnetic moments allowed to undergo free precession under the influence of the earth's magnetic field. Such phase-coherent precession produces a detectable alternating magnetic field. The initial magnitude and the rate of decay of the voltage induced in a nearby detecting coil by this precessional magnetic field provide valuable information which can frequently be used to identify the nature of the material in which the precessing nuclei are located.

In accordance with the present invention, a sensitive and versatile nuclear magnetism testing apparatus is provided which polarizes the magnetic moments of the atomic nuclei of a given chemical element by supplying a locally generated unidirectional field thereto for a selected period of time. This field is then removed and the polarized magnetic moments are thereby allowed to undergo phase-coherent free precession under the influence of the earth's magnetic field. The frequency of the atomic nuclei undergoing free precession is determined directly by counting the number of cycles in a selected period of time, such as one second. To this end, in one embodiment of the present invention a binary counter is provided with indicator lamps associated therewith for accumulating the count and providing a visual indication of the frequency of precession. Moreover, the apparatus provides a visual indication of the initial magnitude of the voltage induced in a detecting coil by the alternating magnetic field produced by the precessing nuclei and is capable of measuring the rate of decay of the phase coherency and the thermal relaxation time of the precession phenomena.

An advantage of this invention is that simultaneous indications are provided of both the precession frequency and the precessional magnetic field amplitude.

The nuclear magnetism testing apparatus of the present invention is useful in conjunction with borehole logging apparatus which is constructed for purposes of conducting subsurface nuclear magnetism measurements in an oil well type of borehole drilled into the earth. In such cases, the surface-located testing apparatus of the present invention can be used to provide important preliminary data which is desirable in order to conduct successful measurements in the borehole. The testing apparatus of the present invention is also useful, apart from the foregoing borehole logging, for purposes of identifying the presence of various chemical substances that may be present in a fluid sample.

For use in connection with borehole logging apparatus, the testing apparatus of the present invention is capable of providing an accurate indication of the nuclear magnetic precession frequency at the particular geographical location in question. This precession frequency is determined by the strength of the earth's magnetic field at the location in question. A preliminary knowledge of the precession frequency is desirable in order to tune the borehole logging apparatus to this frequency in order to obtain optimum performance during the subsequent borehole measurements.

In most borehole cases, the nuclei in question will be hydrogen nuclei because hydrogen nuclei produce relatively strong precession signals and because hydrogen is a relatively common element in nature.

The testing apparatus of the present invention also enables a preliminary test to be made on a sample of the drilling mud which is present in the borehole in question. This preliminary test is performed to determine the magnitude of the nuclear precession signal produced by the hydrogen nuclei contained in the water phase of the drilling mud. If the drilling mud produces more than a desired minimal value of precessional signal, then it is necessary to add special ferro-magnetic additives, such as iron oxide, to the drilling mud in order to reduce the precession signal produced by the drilling mud. If this were not done, the precession signal from the drilling mud would tend to obscure the desired precession signal from the subsurface earth formations.

Apart from its usefulness in connection with nuclear magnetism borehole logging tools, the apparatus of the present invention is also useful for identifying the presence of various chemical substances that may be contained in fluid samples. This is accomplished by measuring the thermal relaxation time of the nuclear precession signal produced by the fluid sample. This thermal relaxation time is dependent upon the chemical substance in which the precessing nuclei are contained, different substances, such as oil and water, providing different thermal relaxation times. Thus, by measuring the thermal relaxation time of a fluid sample, it is frequently possible to identify which of several substances is contained in the fluid sample.

For mixtures of two different hydrogen-containing liquids having known relaxation times, the relaxation time measurements made with the present testing apparatus can be used to provide an approximate indication of the relative percentages of the two liquids. Furthermore, the present testing apparatus can sometimes be used to provide indications of the presence or absence of para-magnetic substances in fluid samples and, more particularly, to provide indications of changes in the amount of a para-magnetic substance that may be contained in the sample.

The fluid samples used in the foregoing tests may, of course, be obtained from various sources. One particularly important source in the case of an oil well borehole is a fluid sample obtained directly from a subsurface earth formation by means of an appropriate formation fluid tester apparatus.

Further objects and advantages of the present invention will be apparent to those skilled in the art from a reading of the following detailed description taken in conjunction with the accompanying drawings, in which:

FIGURE 1 is a perspective view of a portion of a nuclear magnetism apparatus used for polarizing the atomic nuclei of a given sample of matter; and FIGURE 2 is a schematic block diagram illustrating the arrangement of a representative embodiment of the present invention.

Referring now to FIGURE 1 of the drawings, there is shown a perspective view of the primary field generating structure of a nuclear magnetism apparatus 10 which is placed in a geographical location where it is desired to determine the effect of the earth's magnetic field upon elements possessing atomic nuclei with magnetic moments. This apparatus 10 includes a pair of elongated, cylindrical coil support members 12 and 14 which are mounted on a baseboard 16 so that the longitudinal axes of the coil members are parallel to one another. The support member 12 has wound thereon a cylindrical solenoid-type coil 18 composed of many turns of wire. A first lead wire for the coil 18 is connected to a terminal post 20, while the first lead wire for a coil 22, wound around the member 14, is connected to a second terminal post 24. The second lead wires for the coils 18 and 22 are connected together and to a common terminal post 26.

The coil support member 12 is adapted to receive a non-magnetic container such as a plastic bottle 28, which is filled with a sample of matter, such as water, which is known to contain atomic nuclei, in this case, hydrogen nuclei. After placing the bottle inside the coil support member 12, the baseboard 16 of the apparatus 10 is then placed in a horizontal position and rotated until the parallel axes of the coils 18 and 22 are at right angles to the direction of the earth's magnetic field. A compass may be used for achieving this purpose. This alignment has the effect of placing the coil axes in a magnetic east-west direction with respect to the earth's magnetic field. Preferably, the measurements to be performed are carried out at a location which is relatively quiet from a magnetic field standpoint.

The coil structure apparatus 10 is connected by way of suitable lead wires to the various timing and energizing circuits shown in FIGURE 2 of the drawings. As there seen, the terminal 20 for the sample testing coil 18 is connected by way of switch circuit 30 to a battery 32 and to one input terminal of a differential amplifier 34 by way of a relay controlled switch 36. The terminal 24 for the second coil 22 is connected to a second input of the differential amplifier 34 by way of a relay controlled switch 38. Both the switch 36 and the switch 38 are controlled by a common relay coil 39. The common terminal 26 for the two coils 18 and 22 is connected to the chassis ground for the timing and energizing circuits.

In order to supply a polarizing current of perdetermined duration to the sample testing coil 26 and thereby polarize the protons in the water of the bottle 28, it is necessary to momentarily depress a "start" button 40. This momentarily connects a second battery 41 to the input terminals of a one-shot multivibrator 42 and a flip-flop circuit 44. The application of a positive pulse fires the multivibrator 42 so that it will produce an output voltage signal for a predetermined length of time, the duration of the signal being controlled by the internal time constant setting of the multivibrator 42. This time constant may be adjusted to provide different time durations by means of a control knob 42a which controls the selection of the resistor value which is used in the timing circuit of the multivibrator 42.

The output from the multivibrator 42 is supplied to the switch circuit 30 and operates to close the switch 30 and thus connect the energizing battery 32 to the sample testing coil 18. With the switch 30 closed, approximately 5 amperes of current flows from the battery 32 and through the coil 18. This produces a magnetic polarizing field $H_p$ across the water sample which is at right angles to the earth's magnetic field $H_e$. Upon termination of the signal from the one-shot multivibrator 42, the switch 30 opens and the energy stored in the sample testing coil 18 is then rapidly discharged by way of a Zener diode 46 and an ordinary diode 48.

During the foregoing polarizing time, the switches 36 and 38 have been opened. As soon as the energy in the coil 18 is dissipated, these switches 36 and 38 are closed so that the magnitude and the frequency of the nuclear precession signal generated by the protons in the water sample may be observed. Switches 36 and 38 are controlled by the relay coil 39 which received energization current from the flip-flop circuit 44. The positive pulse produced by the momentary actuation of the button 40 had triggered the flip-flop 44 to discontinue the supplying of current to the relay coil 39. The trailing edge of the signal from the multivibrator 42 serves to trigger a further one-shot multivibrator 50 which, in turn, generates a short-duration signal. The trailing edge of this latter signal triggers the flip-flop 44 and drives the flop back into the condition in which the current is supplied to the relay coil 39. Energization of the coil 39 results in the closing of the switches 36 and 38 and the nuclear precession signal detected by the coil 18 is supplied to the first input terminal of the differential amplifier 34.

Any "noise" signal picked up by the coil 18 will be balanced out in the differential amplifier 34 by means of an equal "noise" signal picked up by the second coil 22, this latter signal being supplied to the second input terminal of the differential amplifier 34. Thus, the second coil 22 is used to cancel extraneous noise signals, such as, for example, momentary extraneous fluctuations in the earth's magnetic field. In this regard, the coils 18 and 22 are connected in a series opposing manner relative to one another and with respect to the inputs of the differential amplifier 34.

The nuclear precession signal induced in the coil 18 is an alternating-current (A-C) voltage signal having a frequency of approximately 2.2 kilocycles per second. This signal is amplified by the differential amplifier 34 and applied through a switch 51 to a pulse shaper 52 and to a detector 53 which produces a unidirectional or variable direct-current (D-C) signal having an amplitude proportional to the peak amplitude of the alternating nuclear precession signal. In this regard, the amplifier 34 is preferably a tuned band-pass type of amplifier having its pass band centered at a frequency of 2.25 kilocycles per second, which is approximately the middle of the range of possible values for the frequency of nuclear precession signals for typical values of field strength for the earth's magnetic field.

The D-C signal output from the detector 53 is amplified by a D-C amplifier 54 and then, at the appropriate time, supplied to a current drive circuit 56. The current drive circuit 56 provides an output current signal to a condenser 58 which is proportional to the signal voltage applied to the input of the circuit. The passage of signals between the amplifier 54 and the current drive circuit 56 is controlled by a switch circuit 60 which is "normally" operative to connect the input of the current drive circuit 56 directly to chassis ground, thus preventing any signals from reaching the circuit.

The condenser 58 is used for integration purposes and develops thereacross a voltage representing the time integral of the current supplied thereto. The voltage across the condenser 58 is supplied by way of a second D-C amplifier 62 to an electrical indicating meter 64. The amplifier 62 includes a gain control 62a for purposes of adjusting the full scale deflection of the meter 64.

A switch circuit 66 is used to discharge the condenser 58 and thus to "reset" the integrator represented by the current drive circuit 56 and the condenser 58. The switch circuit 66 is actuated by a short duration "reset" pulse generated by the one-shot multivibrator 50, the pulse occurring immediately after the termination of the polarizing current to the sample testing coil 18.

The purpose of the switch circuit 60 is to enable the condenser 58 to sample and integrate a short piece of the D-C signal from the amplifier 54 at a fixed interval of time after the termination of the polarizing current. This purpose is achieved by supplying the signal from the multivibrator 42 to a further one-shot multivibrator 68. The trailing edge of the signal from the multivibrator 42 triggers the multivibrator 68 which, in turn, produces a voltage signal of approximately 30 milliseconds duration. This voltage signal is supplied to a further one-shot multivibrator 70 and to a second one-shot multivibrator 72 through a conductor 73. The trailing edge of the signal from the multivibrator 68 triggers the multivibrator 70 which produces a further voltage signal of approximately 30 milliseconds duration which is employed to turn off or open the switch 60 and thereby remove the ground clamp from the output of the amplifier 54.

During the desired 30 millisecond measuring interval, the signal from the one-shot multivibrator 70 is represented by a zero voltage level which indicates that the switch circuit 60 will be off during this time. Thus, during the measure interval when the switch 60 is off, the signal at the output of the amplifier 54 is effective to drive the current drive circuit 56 to produce across the condenser 58 a voltage representing the integrated signal value over the 30 millisecond time interval. This integrated signal value may then be observed on the meter 64. One purpose of the integration is to average out any extraneous noise fluctuations that may still be present in the D-C replica of the nuclear precession signal.

Since the lapse of time between the termination of the polarizing current and the beginning of the measure interval is the 30 millisecond time interval introduced by the one-shot multivibrator 68, the signal measurement is always made at the fixed length of time after termination of the polarizing current.

As mentioned above the A-C signal produced in the coil 18 and amplified by the differential amplifier 34 is applied to the pulse shaper 52 through the switch 51 at the same time the signal is applied to the detector 53 for amplitude measurement purposes. As shown, the switch 51 is positioned in its naturally closed state. The pulse shaper 52, which may be a Schmitt trigger circuit, produces a series of positive pulses at the frequency of the A-C signal and these positive pulses are applied to the input terminal of a binary counter 74. Passage of the pulses between the pulse shaper 52 and the binary counter 74 is controlled by a switch circuit 76 which is "normally" operative to connect the input of the binary counter 74 directly to chassis ground, thus shorting out the input of the binary counter and preventing any extraneous counting action.

The switch circuit 76 is in turn controlled by the one-shot multivibrator 72 which includes a control knob 72a for adjusting the length of time over which the multivibrator is operative. As in the case of the multivibrator 70, the multivibrator 72 is triggered by the trailing edge of the signal generated by the multivibrator 68, i.e., 30 milliseconds after the removal of the polarizing current from the sample testing coil 18. Once triggered, the multivibrator 72 produces a voltage signal of approximately one second in duration which disables the switch circuit 76 and causes the removal of the ground clamp from the input of the counter 74. When the multivibrator 72 returns to its quiescent state, the switch 76 is once again enabled and the input to the counter 72 is thereby connected to ground.

For the period of one second, therefore, the counter counts the number of shaped pulses applied to its input terminal. Preferably, the counter is provided with a set of indicator lamps 78 to permit the visual readout of the number accumulated in the counter 74. Energization of the indicator lamps 78 is controlled by a SCR 80 which supplies chassis ground to the lamp drivers of the individual lamps only at the end of the counting operation by the counter 74. In particular, the SCR 80 is triggered by the trailing edge of the one-second voltage signal generated by the multivibrator 72. Triggering of the SCR 80 enables the lamp drivers associated with the lamps 78 to respond to the count accumulated by the counter 74 and the lamps 78 will then provide a visual indication of the precession frequency of the hydrogen nuclei in cycles per second. By preventing the lamps 78 from flickering on and off as the count is accumulated, crosstalk is avoided and the various stages of the counter 74 will not be falsely triggered.

As mentioned above, the short duration "reset" pulse generated by the one-shot multivibrator 50 is employed to trigger the switch circuit 66 to thereby enable the condenser 58 to discharge to ground. This same "reset" pulse is similarly applied to the binary counter 74 in order to "reset" or clear the counter 74 before initiating a second counting operation. When the counter 74 is reset, the current through the SCR 80 drops below the sustaining value of the SCR 80 and the lamps 78 are extinguished.

For calibration purposes, the counter 74 may be connected by the switch 51 to a clock oscillator 82 containing a source of pulses of accurately controlled frequency, including, for example, a tuning fork or a crystal controlled oscillator. To calibrate the nuclear magnetism testing apparatus shown in FIGURE 2, the switch 51 is actuated so as to connect the clock 82 to the pulse shaper 52 and the button 40 is then depressed. The clock 82 continually generates pulses at a predetermined rate but these pulses do not pass into the counter 74 until the multivibrator 72 is triggered, thus disabling the switch circuit 76 and removing the ground clamp from the input of the counter 74. At the end of one second, the indicator lamps 78 should indicate the frequency of the clock 82. If the lamps provide a reading which deviates from the frequency of the clock 82, thus indicating that the time interval is not exactly one second, knob 72a of the multivibrator 72 is varied until the clock rate and the indication by the lamps 78 coincide.

In the operation of the nuclear magnetism testing apparatus, when used in conjunction with a well logging operation, pure water is first inserted into the bottle 12 (FIG. 1) and subjected to a polarizing field of a selected time duration, the operation being initiated by the actuation of the button 40 and the polarize time duration being controlled by the time constant setting of the multivibrator 42. After polarization, the switch circuit 30 is opened, the multivibrator 68 becomes operative for 30 milliseconds in order to allow transients to dissipate, the condenser 58 is discharged through the switch circuit 66 and the binary counter 74 is reset. When the multivibrator 68 returns to its quiescent state, the amplitude of the nuclear precession signal is, after appropriate amplification, detection and integration, observed on the meter 64. If the signal does not provide a full scale deflection, the knob 62a of the amplifier is adjusted until a full scale deflection is realized on the meter 64. This is done in order to facilitate a comparison between magnitude of the nuclear precession signal produced by the hydrogen nuclei of the water and the magnitude of the signal produced by the hydrogen nuclei in the water phase of the drilling mud when the drilling mud is placed under test.

Moreover, concurrently with the application of the A-C voltage signal to the detector 53, the signal is applied through the pulse shaper 52 to the input terminal of the binary counter 74, the pulses appearing at the counter occurring at the frequency of the A-C signal. The counter is operational for the period of one second, the counting time duration being controlled by the time constant setting of the multivibrator 72, and accumulates a number which is representative of the nuclear precession frequency, the frequency being visually read out on the indicator lamps 78. The visual readout of the precession frequency will then enable an operator to tune the borehole logging apparatus to this frequency and thereby obtain an optimum performance from the logging apparatus.

After determining the precession frequency and adjusting the amplifier 62 for full scale deflection, the counter 74 is disconnected from the testing apparatus, and a sample of drilling mud is inserted into the bottle 12. The above-described sequence of operations is initiated by the actuation of the button 40 and the magnitude of the nuclear precession signal produced by the hydrogen nuclei contained in the water phase of the drilling mud is read on the meter 64. This reading is then compared against the full-scale meter deflection produced by the hydrogen muclei of the pure water sample. If the drilling mud produces more than a desired minimal value of precessional signal, special ferro-magnetic additives can be added to the drilling mud in order to reduce the precession signal. If this were not done, the precession signal from the drilling mud would tend to obscure the formation signal from the subsurface earth formation.

As mentioned above, the nuclear magnetism testing apparatus of the present invention may be employed to identify various chemical substances that may be contained in fluid samples. Accordingly, after determining the precession frequency of hydrogen nuclei undergoing phase-coherent free precession and the relative magnitude of the precession signal produced by the hydrogen nuclei in the water phase of the drilling mud, fluid sample is removed from the borehole and inserted into the bottle 12, the counter 74 again being disconnected from the system. A series of initial measurements are conducted on the fluid sample until a critical polarization time is found which produces a maximum amplitude precession signal. It has been found that the maximum amplitude of the signal becomes fixed and does not increase for polarizing times exceeding this critical polarization time. Then, using a polarizing time which produces this maximum value, the gain control knob 62a of the direct current amplifier 62 is adjusted to provide a full scale reading on the meter 64. A series of measurements are then made using successively smaller values of polarizing time. The resulting amplitude measurements are recorded and the amplitude differences, i.e., the difference in signal amplitude for successively shorter polarization times, are determined. These amplitude differences are then plotted as a function of the polarizing time on a semilog graph paper from which the thermal relaxation time may be determined.

When a fluid sample possessing two known different hydrogen-containing components is placed in the bottle 12 and the above-described test operation is performed, a plot of the resulting amplitude differences against polarization time will provide an approximate indication of the relative percentages of the two components. Moreover, relaxation time measurements can be employed to provide indications of changes in the composition of the sample matter under test.

Although the instant invention has been described herein with reference to a specific embodiment, many modifications and variations therein will readily be apparent to those skilled in the art. For example, the above-described nuclear magnetism testing apparatus may be employed to detect inhomogeneities in a local magnetic field, such as, for example, in the effect of the presence of a metal object on the earth's magnetic field. Furthermore, the apparatus may be used as a frequency counter for any external electrical signals within the limits set by the number of stages in the counter 74 and may be employed to measure the time interval between spaced invents. Accordingly, all such variations and modifications are included within the intended scope of the invention as defined by the following claims.

I claim:

1. A nuclear magnetism testing apparatus comprising coil means for applying a polarizing field to a sample of material for a selected period of time and for responding to the phase-coherent precession of the gyromagnetic nuclei therein to thereby produce an electromagnetic sigsignal; measuring means including means responsive to the electromagnetic signal for producing a recordable signal and means for producing a visual indication of the recordable signal; counter means responsive to the electromagnetic signal for counting the number of cycles of the signal in a selected period of time; first time gate means having an adjustable internal time constant adapted to enable the coil means to apply the polarizing field to the sample of material during a selected period of time; second time gate means having an internal time constant and controlled by the first time gate means for enabling the measuring means to respond to the electromagnetic signal during a selected period of time following the termination of the polarizing field; and third time gate means having an adjustable internal time constant and controlled by the first time gate means for enabling the counter means to respond to the electromagnetic signal during another selected period of time following the termination of the polarizing field.

2. A nuclear magnetism testing apparatus according to claim 1 wherein the first time gate means comprises a first circuit having an adjustable unstable state for enabling the coil means to apply the polarizing field to the sample of material and a second circuit having an unstable state and controlled by the first circuit for coupling the electromagnetic signal to the measuring means and the counter means.

3. A nuclear magnetism testing apparatus according to claim 2 werein the first time gate means further comprises a third circuit having an unstable state controlled by the first circuit for enabling the second time gate means and the third time gate means a selected period of time following the termination of the polarizing field.

4. A nuclear magnetism testing apparatus according to claim 1 further comprising indicator lamps responsive to the count accumulated in the counter means and responsive to the third time gate means for providing a visual indication of the frequency of precession at the termination of the counting action.

5. A nuclear magnetism testing apparatus according to claim 1 wherein the measuring means comprises detection means responsive to the electromagnetic signal for providing a pulsating direct-current signal, amplifier means for amplifying the direct-current signal, integrating means for developing a voltage representing the time integral of the direct-current signal supplied thereto and indicator means for indicating the magnitude of the integrated signal.

6. A nuclear magnetism testing apparatus according to claim 1 wherein the coil means comprises a first cylindrical coil wound around a support member and a second cylindrical coil wound around a further support member and connected in series-opposing manner relative to the first cylindrical coil.

7. A nuclear magnetism testing apparatus according to claim 1 further comprising clock means providing output signals at a known rate adapted to be connected to the counter means to enable adjustment of the internal time constant of the third time gate means to a desired time interval.

References Cited

UNITED STATES PATENTS

| | | | |
|---|---|---|---|
| 2,851,596 | 9/1958 | Hilton | 324—68 |
| 3,004,211 | 10/1961 | Anderson | 324—0.5 |
| 3,098,197 | 7/1963 | Barringer | 324—0.5 |
| 3,371,270 | 2/1968 | Rochet | 324—0.5 |

OTHER REFERENCES

Journal of Scientific Instruments, vol. 35, March, 1958, pp. 88–93. (Waters.)

Journal of the British IRE, vol. 19, No. 12, December 1959, pp. 769–776 (Burrows).

Journal of Geophysical Research, vol. 63, No. 2, June, 1958, pp. 277–288 (Heppner).

RUDOLPH V. ROLINEC, Primary Examiner

MICHAEL J. LYNCH, Assistant Examiner